United States Patent [19]

Wada et al.

[11] Patent Number: 5,442,686
[45] Date of Patent: Aug. 15, 1995

[54] IMAGE COMMUNICATION APPARATUS

[75] Inventors: Satoshi Wada, Kawasaki; Takehiro Yoshida, Tokyo, both of Japan

[73] Assignee: Canon Kabushiki Kaisha, Tokyo, Japan

[21] Appl. No.: 297,414

[22] Filed: Aug. 29, 1994

Related U.S. Application Data

[63] Continuation of Ser. No. 887,599, May 21, 1992, abandoned, which is a continuation of Ser. No. 516,302, Apr. 30, 1990, abandoned.

[30] Foreign Application Priority Data

| May 2, 1989 | [JP] | Japan | 1-112914 |
| May 8, 1989 | [JP] | Japan | 1-113662 |
| May 11, 1989 | [JP] | Japan | 1-116071 |

[51] Int. Cl.$^6$ .............. H04M 1/57; H04M 1/64; H04M 11/00
[52] U.S. Cl. .............. 379/88; 379/100; 379/142
[58] Field of Search .............. 379/67, 88, 100, 142; 358/434, 437, 440

[56] References Cited

U.S. PATENT DOCUMENTS

| 3,946,158 | 3/1976 | Leclercq et al. | 379/53 |
| 4,304,968 | 12/1981 | Klausner et al. | 379/69 |
| 4,677,660 | 6/1987 | Yoshida | 379/100 |
| 4,717,967 | 1/1988 | Yoshida | 358/296 |
| 4,720,848 | 1/1988 | Akiyama | 379/88 |
| 4,729,033 | 3/1988 | Yoshida | 358/257 |
| 4,800,439 | 1/1989 | Yoshino | 358/257 |
| 4,815,121 | 3/1989 | Yoshida | 379/67 |
| 4,823,375 | 4/1989 | Yoshida | 379/100 |
| 4,829,524 | 5/1989 | Yoshida | 371/32 |
| 4,837,797 | 6/1989 | Freeny, Jr. | 379/96 |
| 4,837,806 | 6/1989 | Watanabe | 379/93 |
| 4,876,707 | 10/1989 | Hashimoto | 379/57 |
| 4,885,755 | 12/1989 | Yoshida | 375/58 |
| 4,894,861 | 1/1990 | Fujioka | 379/374 |
| 4,907,094 | 3/1990 | Mishima et al. | 358/437 |
| 4,910,506 | 3/1990 | Yoshida et al. | 340/825.07 |
| 4,916,607 | 4/1990 | Teraichi et al. | 379/98 X |
| 4,922,524 | 5/1990 | Baba et al. | 379/100 |
| 4,932,048 | 6/1990 | Kenmochi et al. | 379/67 |
| 4,994,797 | 2/1991 | Breeden | 340/825.44 |
| 4,994,926 | 2/1991 | Gordon et al. | 358/400 |
| 4,996,707 | 2/1991 | O'Malley et al. | 379/100 |
| 5,008,926 | 4/1991 | Misholi | 379/89 |
| 5,014,296 | 5/1991 | Saigano | 379/67 |
| 5,031,179 | 7/1991 | Yoshida et al. | 371/32 |
| 5,093,857 | 3/1992 | Yoshida et al. | 379/100 |
| 5,127,013 | 6/1992 | Yoshida | 371/32 |
| 5,214,690 | 5/1993 | Kato et al. | 379/100 |
| 5,355,230 | 10/1994 | Kaneko | 358/437 |
| 5,369,686 | 11/1994 | Dutra et al. | 379/94 |

FOREIGN PATENT DOCUMENTS

| 0233648 | 9/1988 | Japan | 379/100 |
| 0320850 | 12/1989 | Japan | 379/100 |

Primary Examiner—Thomas W. Brown
Attorney, Agent, or Firm—Fitzpatrick, Cella, Harper & Scinto

[57] ABSTRACT

An image communication apparatus includes a detection device for detecting an identification number sent from a calling station terminal, and an output device for outputting information indicating a call received from the identification number when a called station does not respond to the telephone call.

32 Claims, 12 Drawing Sheets

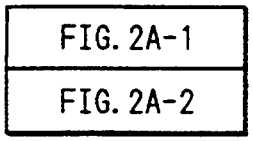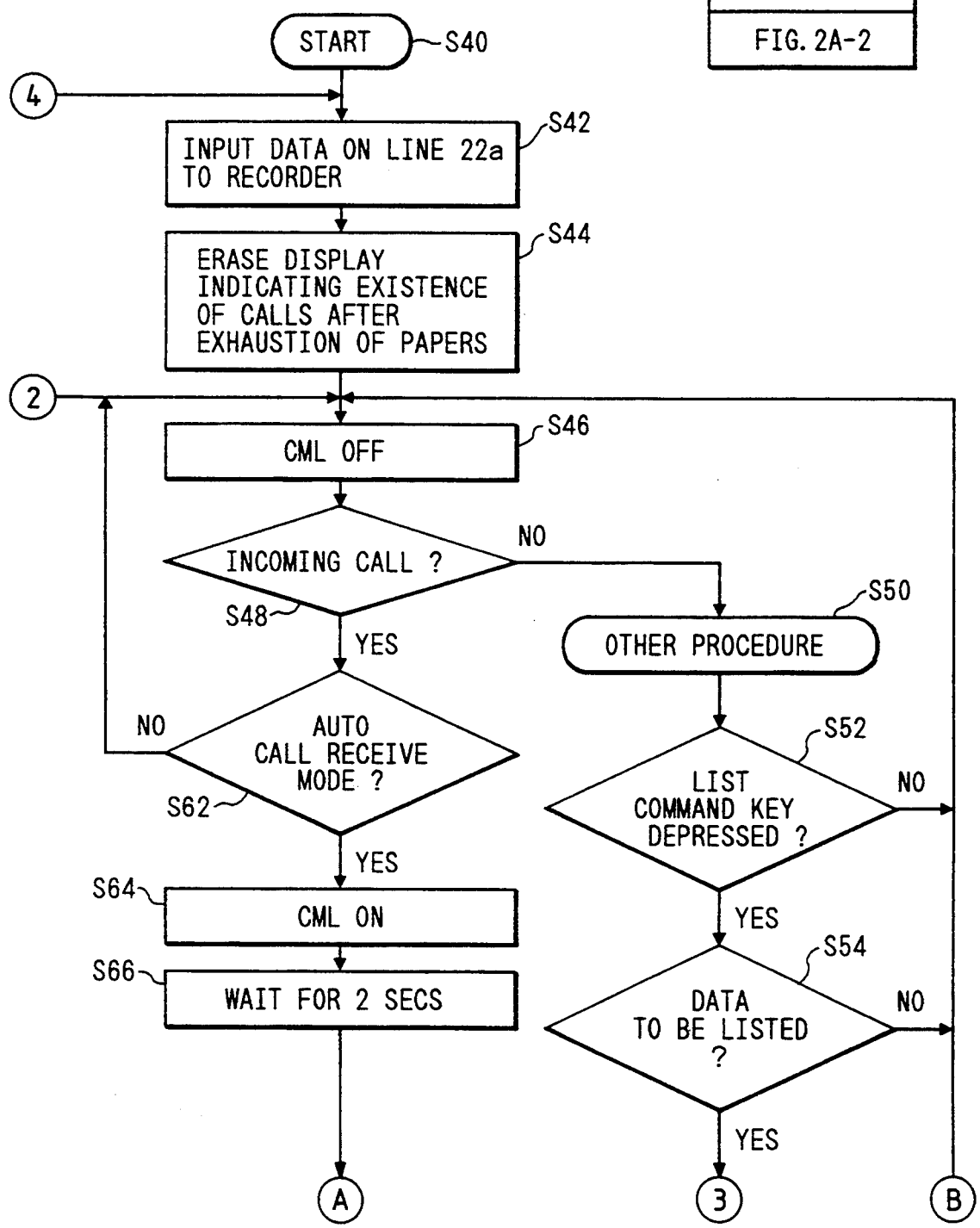

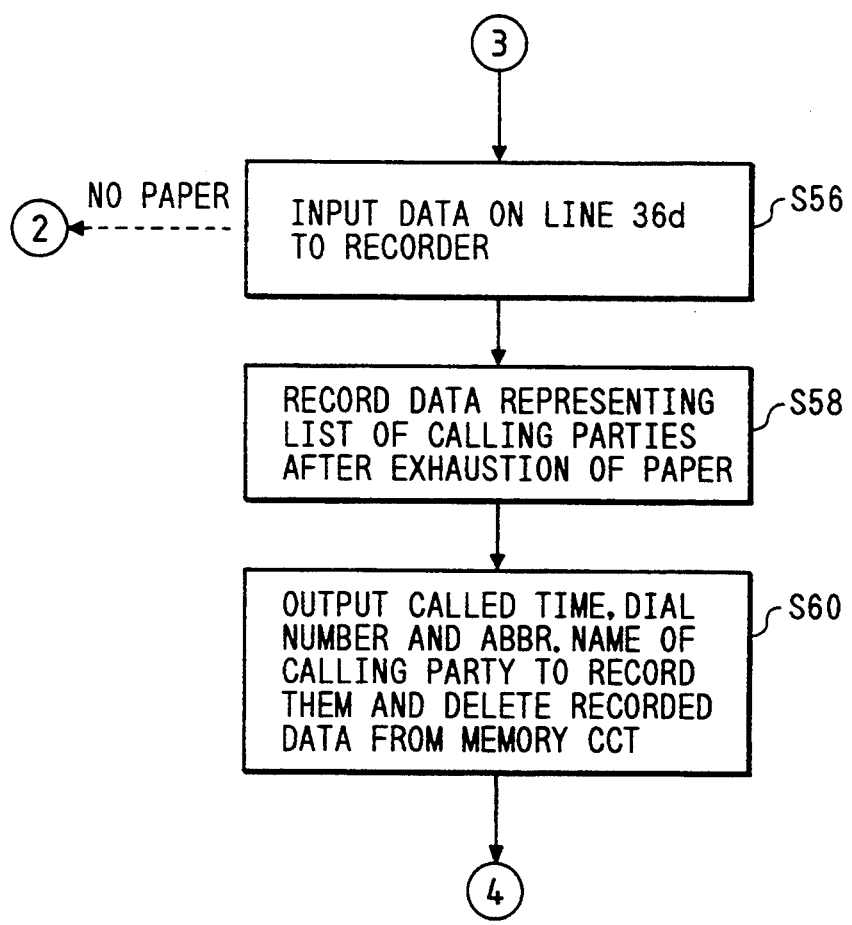

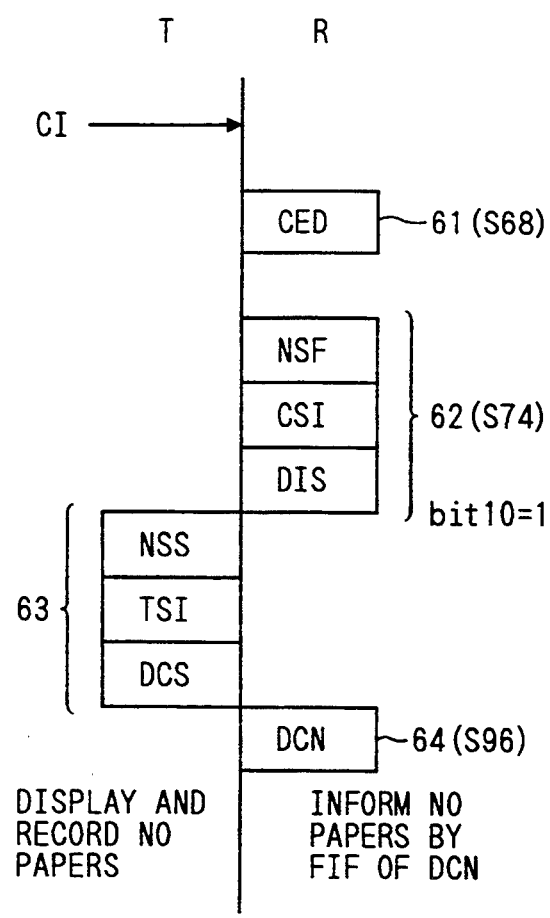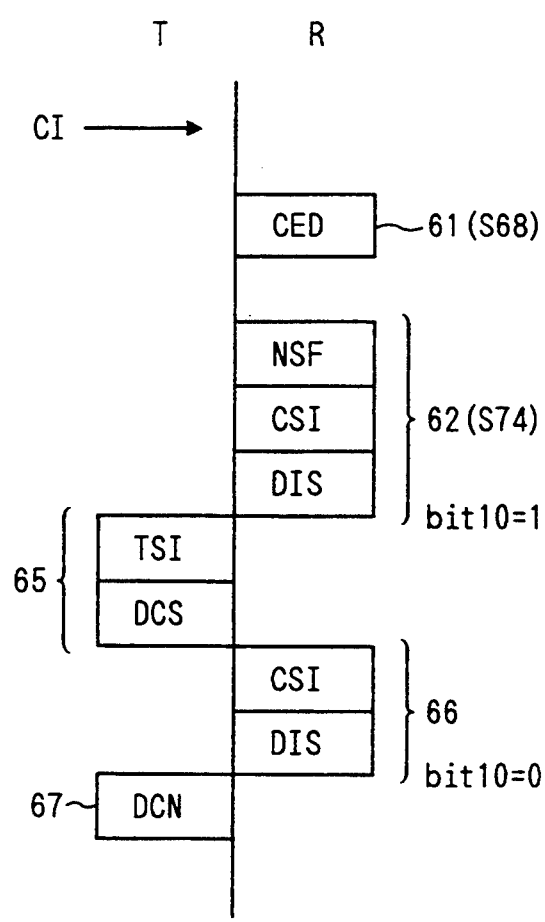

FIG. 4

LIST OF CALLING PARTIES AFTER EXHAUSTION OF PAPERS

| CALLED TIME | DIAL NUMBER | ABBR. NAME |
|---|---|---|
| 12/1 20:10 | 03 123 4567 | ABC TRAILING CO. |
| 12/1 20:30 | 03 111 1111 | WATANABE STORE |
| 12/1 20:50 | 03 222 2222 | YOKOTA MACHINE |

71: CALLED TIME, DIAL NUMBER
72: ABBR. NAME

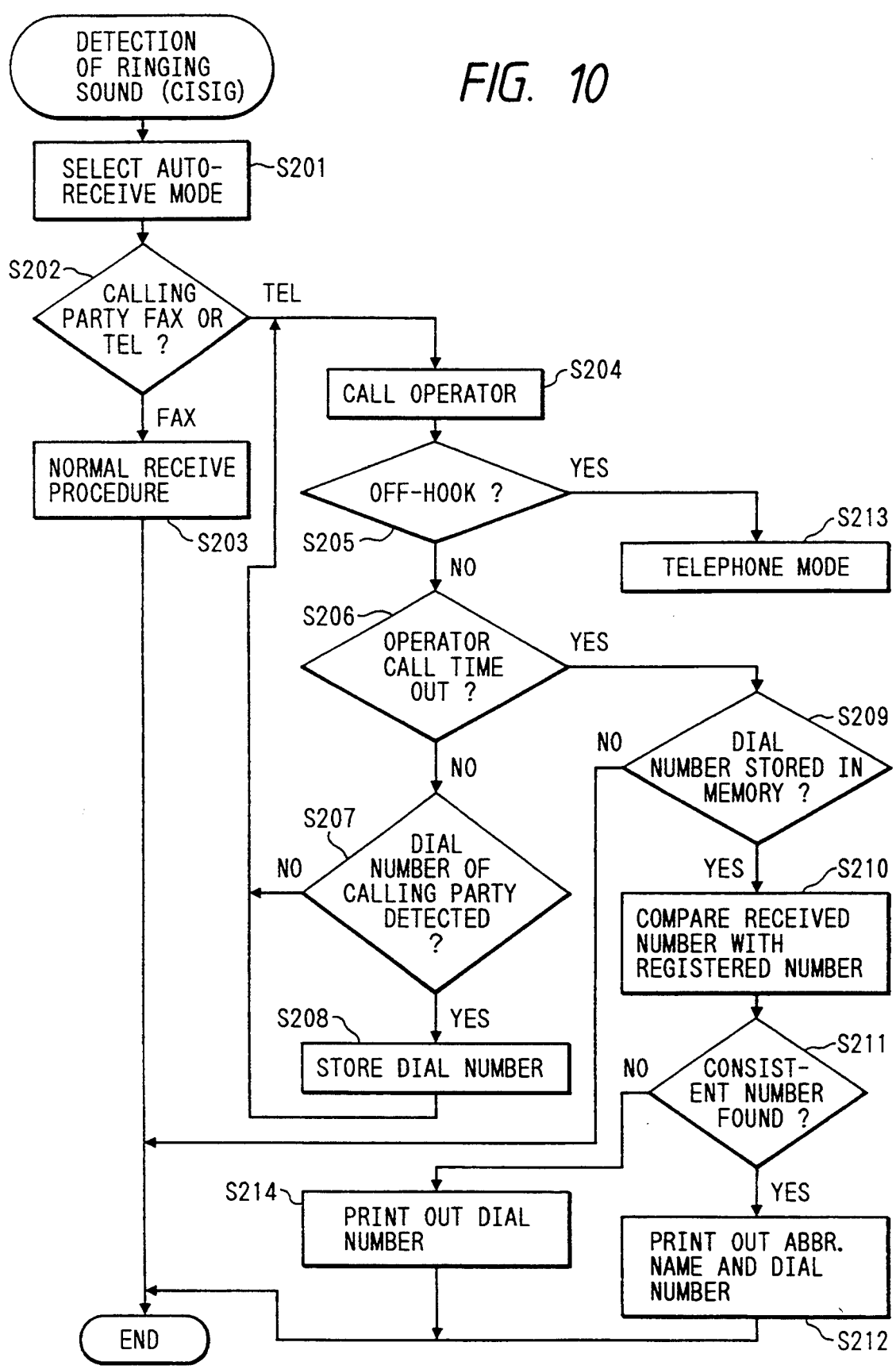

IMAGE COMMUNICATION APPARATUS

This application is a continuation of application Ser. No. 07/887,599 filed on May 21, 1992, now abandoned, which is a continuation of prior application Ser. No. 07/516,302 filed on Apr. 30, 1990, now abandoned.

BACKGROUND OF THE INVENTION

1. Field of the Invention

The present invention relates to an image communication apparatus.

2. Related Background Art

In a prior art apparatus of this type, for example, a facsimile machine, when a calling party intends to call a called party by telephone, he/she has to execute facsimile reception if a line is used exclusively for facsimile and an auto-receive mode has been set in the called station.

In order to avoid the above inconvenience, means for automatically determining whether a calling terminal is telephone or facsimile is provided in a called terminal, and if it is the telephone, some message is sent back to the calling terminal and the called party is called simultaneously, or a mode to record a calling party's message is established. A device for recording the calling party's message may be a memory IC for short time recording or a micro-cassette for long time recording.

However, in the apparatus of the type in which the called party is called in response to the telephone call by the calling party, if the called party is absent, the calling party cannot leave any message to the called party in spite of the usage of the line.

Even if the facsimile machine of the called party has a function to record the message of the calling party, the same inconvenience may take place if the recording device has been exhausted.

A facsimile machine which detects a call from a line to automatically start communication has been known.

In prior art automatic receive control, an operation of the apparatus or a set status is determined, and if the receiving operation is permitted, the receiving operation is started. On the other hand, if the recording operation is not permitted because no record sheet is set or because no record sheet is set and substitution reception is not permitted due to fullness of substitution reception memory, the telephone set is rung to initiate manual receiving operation.

However, even if the telephone set is rung when the receiving operation is not permitted because of no record sheet, there will be no response if an operator is absent, and the facsimile communication is not attained. The operator at the sending terminal cannot recognize a cause for disability of communication.

Since the called party cannot receive the information, he/she may loose an important business opportunity because of lack of important information.

In a prior art image communication apparatus such as a facsimile machine, a telephone number or abbreviation thereof is sent to a destination station by using a facsimile protocol signal, and it is recorded on a record sheet at the receiving station or stored as communication control information. In the receiving station, the telephone number or abbreviation thereof of the sending station is recorded as header information, and the telephone number or abbreviation thereof stored as the communication control information is recorded in a form of report as required.

In the prior art apparatus, however, the information derived from the protocol signal is not used in a manner other than record output nor is it reused as new communication information. As a result, a scope of utilization of the available information is limited.

Patents relating to the auto-reception include U.S. Pat. Nos. 4,677,660; 4,800,439; 4,815,121; 4,823,375; 4,837,806; 4,916,607; 4,907,094; and 4,932,048.

However, there has been no proposal for the solution of the above problems.

SUMMARY OF THE INVENTION

It is an object of the present invention to improve an image communication apparatus to overcome the above problems.

It is another object of the present invention to provide an image communication apparatus which can convey the fact of reception of call if an operator is absent or image communication is not established when the call is received.

It is another object of the present invention to recognize a calling party when a call is received, and if a response cannot be given to the call, enable later outputting of information of the calling party.

It is another object of the present invention to recognize a calling party when a call is received, and if the calling party is a pre-registered party, enable outputting of information of call.

It is another object of the present invention to receive information of a calling party when image communication cannot be established in response to a call, and enable later outputting of the information of the calling party.

It is another object of the present invention to output information received in accordance with protocol in an identifiable manner.

It is another object of the present invention to convert information received in accordance with protocol to a voice signal to output it.

Other objects of the present invention will be apparent from the detailed description of the preferred embodiments and the accompanying drawings.

BRIEF DESCRIPTION OF THE DRAWINGS

FIGS. 3A and 3B show a communication sequence in the first embodiment, FIG. 4 shows an example of record output in the first embodiment.

DETAILED DESCRIPTION OF THE PREFERRED EMBODIMENTS

Embodiments of the present invention are now explained in detail with reference to the drawings.

In the following embodiments, a facsimile machine is used as an image communication apparatus.

Figure 1:
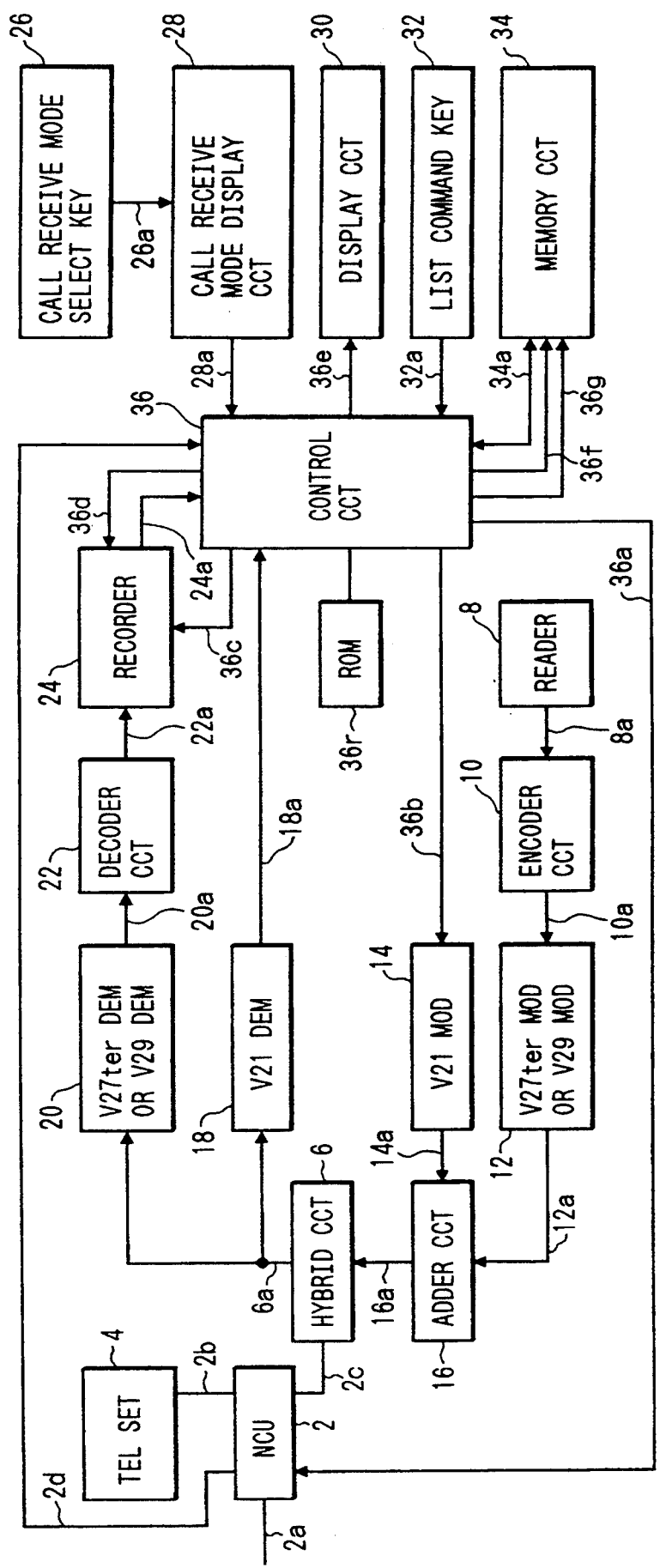
FIG. 1 shows a block diagram of a first embodiment of a facsimile machine of the present invention.

FIG. 1 shows a block diagram of a first embodiment of the facsimile machine.

Numeral 2 denotes a network control unit (NCU) connected to a terminal of a line to control connection of a telephone switching network, switching to a data communication line or holding of a loop in order to use the telephone network for data communication.

Numeral 2a denotes a telephone line. The NCU 2 receives a signal on a signal line 36a, and when a signal level thereof is "0", it connects the telephone line to a telephone set, that is, connects the signal line 2a to a signal line 2b. When the signal level of the signal on the signal line 36a is "1", the NCU connects the telephone line to a facsimile machine, namely, connects the signal line 2a to a signal line 2c.

In a normal state, the telephone line 2a is connected to a manually controlled or speaker telephone set 4. When the NCU 2 detects a calling signal, it produces a signal level "1" on a signal line 2d, and when it does not detect the calling signal, it produces a signal level "0" on the signal line 2d.

A hybrid circuit 6 separates a signal in a sending channel from a signal in a receiving channel. A sending signal on a signal line 16a passes through the signal line 2c and is sent to the telephone line 2a through the NCU 2. A signal sent from the calling station is received by the NCU 2 and sent to a signal line 6a through the signal line 2c.

The sending channel is now explained.

Numeral 8 denotes a reader which sequentially reads line image signals of main scan direction from a document sheet to be transmitted to generate black and white binary signals. It comprises an imaging device such as a CCD (change coupled device) and an optical system. The black and white binary signal train is supplied to an encoder 10 through a signal line 8a.

The encoder 10 receives the data on the signal line 8a and produces a coded (MH coded or MR coded) data on a signal line 10a.

A modulator 12 modulates in accordance with the known CCITT Recommendation V27 ter (differential phase modulation) or V29 (quadrature modulation). The modulator 12 modulates the signal received from the signal line 10a and supplies modulated data to an adder 16 through a signal line 12a.

A modulator 14 modulates in accordance with the known CCITT Recommendation V21. It modulates a facsimile protocol signal received from a signal line 36b and supplies modulated data to the adder 16 through a signal line 14a.

The adder 16 receives the signals on the signal lines 12a and 14a and outputs a sum on a signal line 16a.

The receiving channel is now explained.

A demodulator 18 demodulates in accordance with the known CCITT Recommendation V21. It receives the signal on the signal line 6a, demodulates it in accordance with V21, and supplies demodulated data to a control circuit 36 through a signal line 18a.

A demodulator 20 demodulates in accordance with the known CCITT Recommendation V27 ter (differential phase modulation) or V29 (quadrature modulation). The demodulator 20 demodulates the signal received from the signal line 6a and supplies demodulated data to a decoder 22 through a signal line 20a.

The decoder 22 receives the demodulated data from the signal line 20a and supplies decoded (MH decoded or MR decoded) data to a recorder 24 through a signal line 22a.

The recorder 24 comprises a record sheet feed unit and a thermal head. When the signal level on the signal line 36c is "0", the recorder 24 receives the decoded data on the signal line 22a and sequentially records it.

When the signal level on the signal line 36c is "1", the recorder 24 records the data supplied from the control circuit 36 through the signal line 36d. The output data from the control circuit is in the form of character code, and the recorder 24 develops the characters corresponding to the input codes into dot matrix data by a built-in character generator.

As will be described later, the control circuit 36 causes the recorder 24 to record data of communication operation by a calling party after the record sheet has been exhausted, a communication time, a user abbreviated code indicative of a sending machine of the calling party and a user telephone number.

The control circuit 36 may detect the remaining amount of record sheets such as cut forms or rolled sheet of the recorder 24 through a signal line 24a. If the remaining amount of the record sheets is sufficient, the recorder 24 sends a signal level "1" to the signal line 24a, and if it is not sufficient, the recorder 24 sends a signal level "0" to the signal line 24a. A known record sheet sensor in the recorder may be used to detect the record sheets.

A call receive mode select key 26 is used to select a call receive mode. Each time the call receive mode select key 26 is depressed, a pulse is generated on a signal line 26a.

A call receive mode display circuit 28 produces a signal for controlling the call receive mode in accordance with the selection status of the call receive mode select key 26, on a signal line 28a. It also displays the set call receive mode by an LED or an LCD panel.

In a reset status after power-on, the call receive mode display circuit 28 indicates the setting of an auto-receive mode, and produces a signal level "0" on the signal line 28a. Each time a pulse is generated on the signal line 26a, the display circuit 28 alternately displays the setting of the manual receive mode and the setting of the auto-receive mode.

When the auto-receive mode is displayed, the call receive mode display circuit 28 produces a signal level "0" on the signal line 28a, and when the manual receive mode is displayed, it produces a signal level "1" on the signal line 28a.

Numeral 30 denotes a display which is used to inform to a user that a communication operation has been done after the exhaustion of the record sheet. The display 30 does not display when the signal level "0" is on a signal line 36e, and displays when the signal level "1" is on the signal line 36e to indicate that the communication operation was done after the exhaustion of the record sheet.

A list command key 32 is used to command outputting of a list of communicated stations. When the list command key is depressed, a pulse is generated on a signal line 32a.

A memory 34 stores time of communication after the exhaustion of the record sheet in the recorder 24, a user abbreviated code indicative of a calling party and a user telephone number.

When communication is done in a sequence to be described later, a communication number, communication data and time, a telephone number of a calling or called party and a user abbreviation of that party are stored in the memory 34. When such information is to be written, the control circuit 36 sends the data to the signal line 34a and then generates a write pulse on a signal line 36g.

On the other hand, when the control circuit 36 reads out the information stored in the memory 34, it sends the communication number to the signal line 34a and generates a read pulse on a signal line 36f. In response thereto, the memory 34 sends the stored information to the signal line 34a.

The memory 34 is backed up by a battery so that it can retain the memory content when a main power supply is cut.

The control circuit 36 may comprise a microprocessor and controls the respective units in accordance with a program stored in a ROM 36r.

The operation of the above configuration is now explained.

An operation of the facsimile machine is first explained. It is assumed that the facsimile machine executes the CCITT Recommendation T30 as a facsimile protocol.

First, in the auto-receive mode, when a call from a calling station is detected, the auto-reception is carried out, if the reception is permitted, to receive an image signal. For example, even if the record sheet is not present and the reception is not permitted, the receiving operation is initiated and an initial identification (NSF/CSI/DIS) signal is sent.

Then, a receive command (NSS/TSI/DCS) sent from the calling station is received, and the user abbreviation of the calling station transmitter, user telephone number and communication time which are included in the received information are stored in the memory 34, and display is made to indicate that the communication operation was done after the exhaustion of the record sheet and the information of the calling station has been stored.

When the NSS signal is received and the calling station has the corresponding communication function (the calling station also has the configuration of FIG. 1), a DCN signal having a predetermined FIF (facsimile information field) is sent to the calling station. The FIF of the DCN signal includes information which indicates that no record sheet is set.

When the calling station transmitter receives the DCN signal having the FIF, it displays a message indicating that the communication is not permitted because no record sheet is set in the destination facsimile machine.

On the other hand, when the NSS signal is not sent and the calling station does not have the function corresponding to that of the called station, the NSF/CSI/DIS signal is sent again to inform to the calling station transmitter that the record sheet is not set.

When the command to output the information of the calling station after the communication operation by the operator after the exhaustion of the record sheet has been done is issued, the record of the communication operation from the calling station after the exhaustion of the record sheet, the time of communication, the user abbreviated code indicative of the calling station transmitter and the user telephone number are sequentially outputted.

Figures 2, 2A:
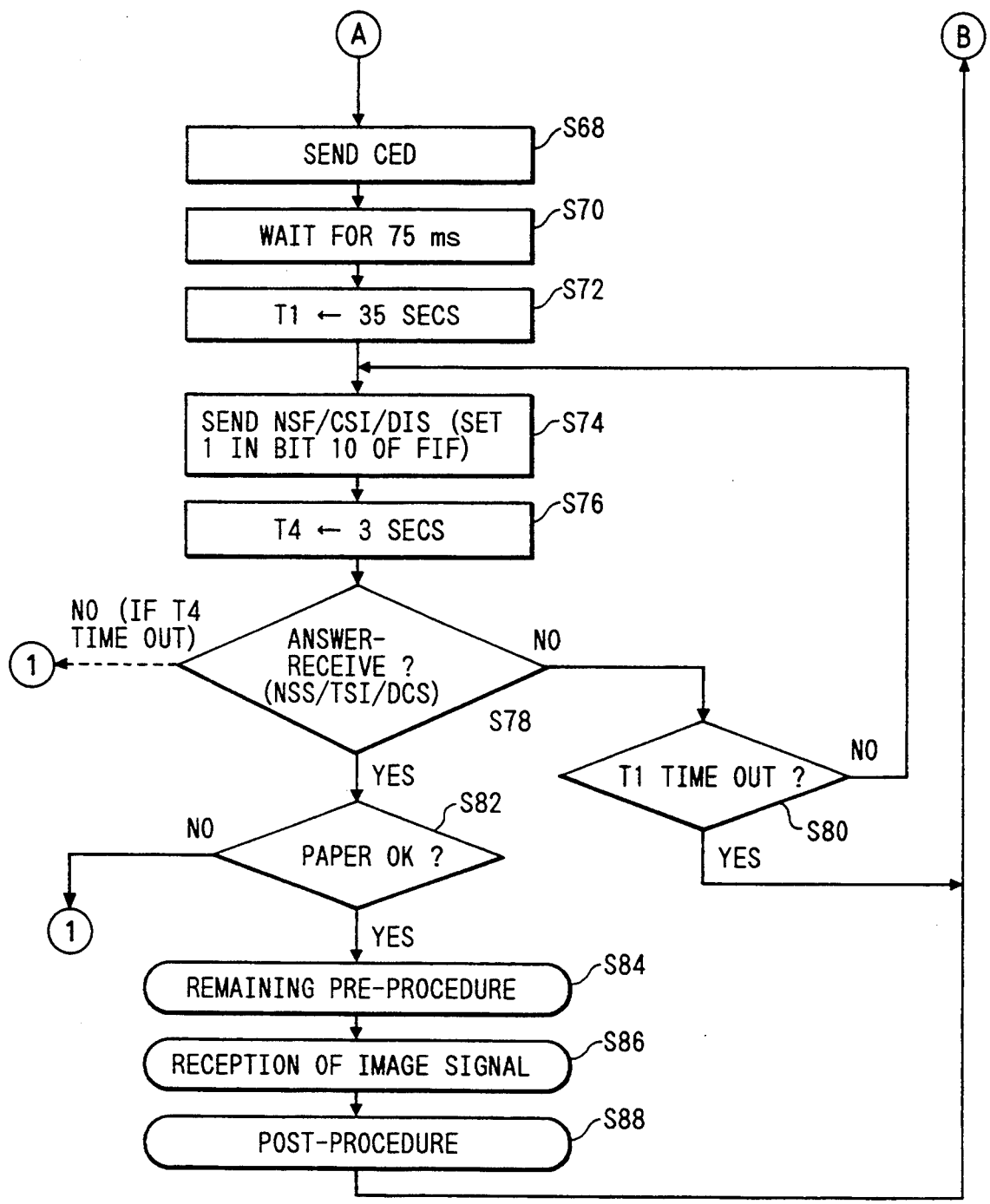
FIG. 2A shows the relationship between FIGS. 2A-1 and 2A-2, and FIGS. 2A-1, 2A-2, 2B and 2C show flow charts of a control sequence of a control circuit in the first embodiment.

The operation of the above configuration is now explained with reference to FIGS. 2A-1 to 2C. These figures show a control sequence of the control circuit 36 of FIG. 1 stored in the ROM 36r.

In a step S42, the control circuit 36 sends the signal level "0" to the signal line 36c to record the data on the signal line 22a by the recorder 24.

In a step S44, the signal level "0" is sent to the display 30 through the signal line 36e to turn off the display which indicates the communication operation after the exhaustion of the record sheet. (The display 30 is reset).

In a step S46, the signal level "0" is sent to the signal line 36a to turn off the CML relay of the NCU 2, that is, connect the line 2a to the telephone set 4.

In a step S48, the signal on the signal line 2d is examined to determine whether a call has been received. If a call has been received, the process proceeds to a step S62, and if the call has not been received, the process proceeds to a step S50.

In the step S50 in case of no call received, designated non-communication processing such as copying of a document sheet and registration of a telephone number is executed.

In a step S52, the signal on the signal line 32a is examined to determine if the list command key 32 has been depressed. If it has been depressed, the memory 34 is checked in a step S54, to determine if data to be outputted is stored. If it is, the process proceeds to a step S56 of FIG. 2C, and if it is not, the process proceeds to a step S46. If the list command key 32 has not been depressed in the step S52, the process proceeds to a step S46.

In steps S56 et seq. of FIG. 2C, the data of the calling station is recorded.

In the step S56, the signal level "1" is sent to the signal line 36c to set the recorder 24 to receive the data on the signal line 36d. It is assumed that the record sheets have been loaded in the recorder 24. If the record sheet is not loaded, the process returns to the step S46.

In a step S58, information "list of stations communicated after the exhaust of the record sheet" is sent to the signal line 36d and the information is recorded. The recorder 24 develops it into image data.

In a step S60, the communication time, the communicating station telephone number and the user abbreviation of the communication station are read from the memory 34, and the information is sequentially sent to the signal line 36d and recorded by the recorder 24. The recorded information is erased from the memory 34.

On the other hand, when the reception of call is detected in the step S48, the signal on the signal line 28a is examined to determine if the auto-receive mode has been set in a step S62. If it has, the process proceeds to a step S64, and if the manual receive mode has been set, the process proceeds to a step S46.

In the step S64 in case of the auto-receive mode, the signal level "1" is sent to the signal line 36a to turn on the CML relay of the NCU 2, that is, connect the line to the hybrid circuit 6.

In a step S66, waiting is made for two seconds.

In a step S68, a CED (called equipment identification) signal is sent to inform to the calling station that the called station is a non-voice terminal.

In a step S70, waiting is made for 75 milliseconds. In a step S72, 35 seconds interval is set into a timer T1.

This interval corresponds to an initial identification time to detect the protocol signal of the calling station.

In a step S74, an NSF/CSI signal and a DIS signal (which sets the tenth bit of the FIF to "1") are sent out through the signal line 36b. In a step S76, 3 seconds interval is set into a timer T4. In a step S78, the signal on the signal line 18a is examined to determine if a response has been received. If the NSS/TSI/DCS signal of the calling station has been received, the process proceeds to a step S82, and if the timer T4 is timed out without receiving the NSS/TSI/DCS signal, the process proceeds to a step S80.

In the step S80, whether the timer T1 is timed out or not is determined. If the timer T1 is timed out, that is, if the protocol signal of the calling station has not been received in the initial identification time, the process proceeds to the step S46, and if the timer T1 is not timed out, the process proceeds to a step S74. If the protocol signal of the calling station is received in the initial identification time, the process proceeds to the step S82 where the signal on the signal line 24a is examined to determine if the record sheets have been loaded in the recorder 24. If they have been loaded, the process proceeds to a step S84 where remaining pre-protocol, reception of the image signal (step S86) and post-protocol (step S88) are executed. If the record sheets have not been loaded in the recorder 24, the process proceeds to a step S90 of FIG. 2B.

Figure 2B:
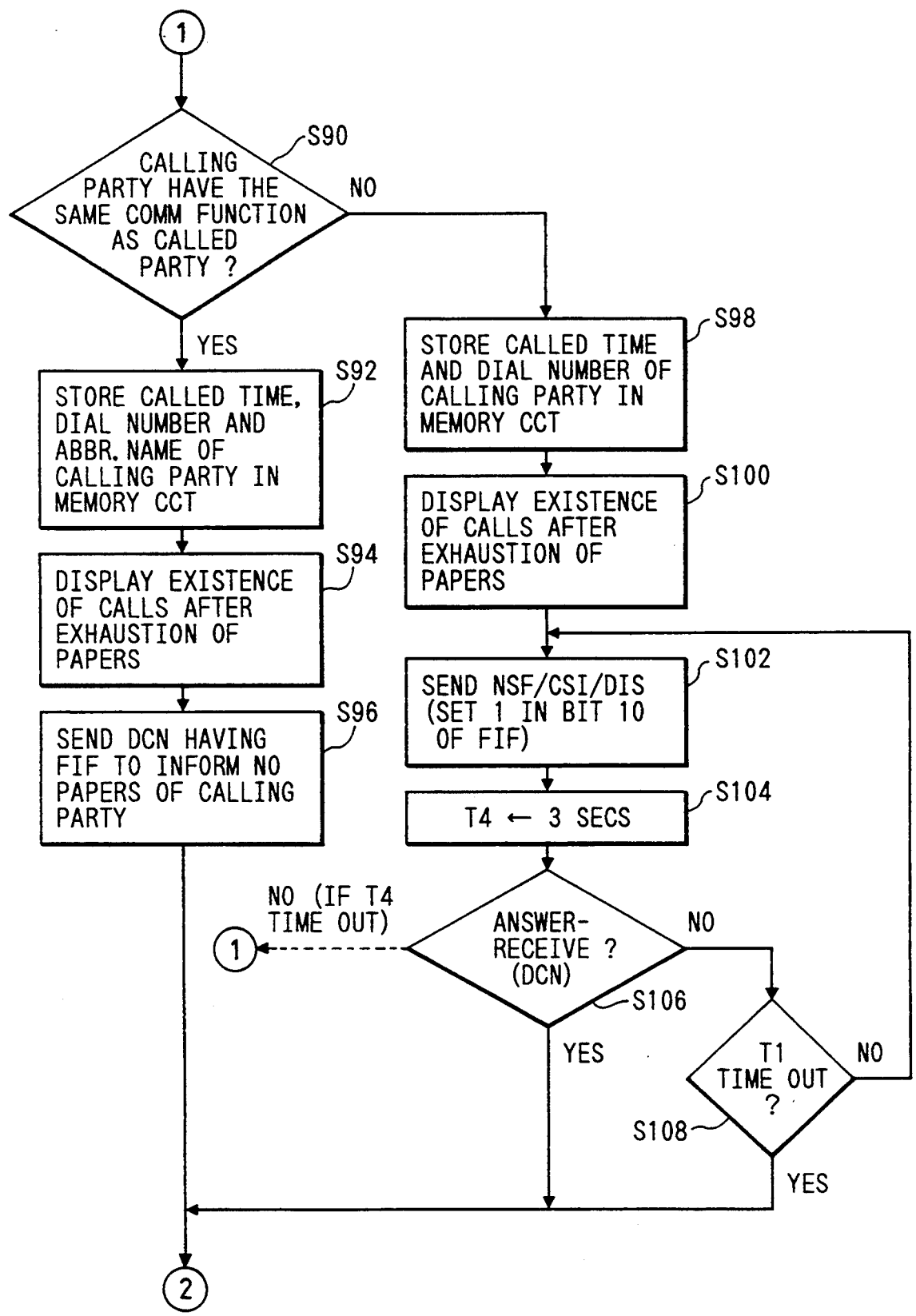

In the step S90 of FIG. 2B, the NSS/TSI/DCS signal of the calling station is analyzed to determine if the receiver of the calling station is of the same manufacturer as that of the called station (or if it is equipped with the same communication function). If the decision is yes, the process proceeds to a step S92, and if the decision is no, the process proceeds to a step S98.

In the step S92, the communication time, the calling station telephone number and the calling station user abbreviation are stored into the memory 34. In a step S94, the signal level "1" is sent to the signal line 36e to indicate that the communication was done after the exhaustion of the record sheet. In a step S96, the DCN signal having FIF with no record sheet is sent out through the signal line 36b to inform to the calling station that the record sheet is not set.

In the step S98 in case that the calling station has a different equipment, the communication time and the calling station telephone number are stored in the memory 34. In a step S100, the signal level "1" is sent to the signal line 36e to indicate by the display 30 that the communication was done after the exhaustion of the record sheet.

In a step S102, the NSF/CSI signal and the DIS signal (which sets the tenth bit of the FIF to "0") are sent out through the signal line 36b. In a step S104, three seconds interval is set into the timer T4. In a step S106, the signal on the signal line 18a is examined to determine if the response was received. If the DCN signal is received in the step S106, the process returns to the step S46, and if the DCN signal is not received before the timer T4 is timed out, the process proceeds to a step S108.

In the step S108, whether the timer T1 is timed out or not is determined. If the initial identification time is over, the process returns to the step S46, and if the initial identification time is not over, the process proceeds to the step S102.

FIG. 3 shows a sequence of the auto-receiving mode without the record sheet under the control described above. FIG. 3A shows the sequence when the transmitter is of the same brand and FIG. 3B shows the sequence when the transmitter is of other brand.

In FIGS. 3A and 3B, the CED signal and the NSF/CSI/DIS signal are sent from the receiving station R to the calling station T, in the steps S68 and S74.

The communication function of the calling station is identified by the subsequent protocol signal. If the calling station T is of the same brand, the NSS/TSI/DCS signal 63 is sent as shown in FIG. 3A, and if it is of other brand, the TSI/DCS signal is sent as shown in FIG. 3B.

In the receiving station R, the brand is identified, in accordance with the above procedure, and if the calling station T is of the same brand, the DCN signal is sent as shown in FIG. 3A to disconnect the line from the receiving station R. If it is of other brand, the CSI signal and the DIS signal (which sets the tenth bit to "0") are sent to disconnect the line by the DCN signal from the calling station T.

When the calling station is of the same brand, information indicating that the communication is not established because of no second sheet at the receiving station R is displayed at the calling station T after the line has been disconnected in FIG. 3A.

The record in the step S60 of FIG. 2C, that is, the list of stations communicated after the exhaustion of the record sheet may be done in a format shown in FIG. 4. The record format comprises a title field provided in the step S58 and a succeeding table field 72 of the information including the time, the calling station telephone number and the calling station user abbreviation.

With the above configuration, even if the record sheet in the recorder 24 has been exhausted and the facsimile communication is not established, the auto-reception is not rejected as opposed to the prior art apparatus but it is received and the information of the calling station is stored.

If only the reception is done, it is indicated so that the user may detect the reception time, the calling station telephone number and the name by depressing the list command key 32.

Thus, it is possible to know who made calls during the absence and communicate through telephone or facsimile machine by utilizing the recorded time, calling station telephone number and name. Accordingly, the loss of business opportunity is avoided.

If the calling station is of the same brand or has the compatible function, the fact that the receiving station cannot establish the communication and the reason therefor may be displayed or recorded as shown in FIG. 3A. Thus, the calling station may take necessary action such as recommunication.

In the above description, the station received after the exhaustion of the record sheet is recorded. Alternatively, it may be displayed. In this case, since the calling station can be identified without record sheet, the calling station can be identified even if there is no stock of the record sheet.

In the above embodiment, the reception of the call after the exhaustion of the record sheet is displayed by the display 30 and the list of the calling stations is outputted by the depression of the list command key 32. Alternatively, the list for the reception of call after the exhaust of the record sheet may be automatically outputted without operator's instruction when the record sheets are set.

In the above embodiment, it is assumed that the image data is recorded. In an apparatus in which an image memory receives the image data when such data cannot be recorded, the image data is received by the image memory for substitution after the recording has been disabled and until the image memory becomes full. Then, only the reception of call may be carried out as it is done in the above embodiment to store the data of the calling station, and it may be recorded by the operator's instruction.

In the above embodiment, only the time, calling station telephone number and user abbreviation are outputted. Where other information is available from the communication protocol, it may be stored and outputted.

In the above embodiment, the exhaustion of record sheets is considered as a cause of communication disability. Where a laser beam printer is used in the recorder 24, the exhaustion of toner may be another cause, and where a thermal transfer printer is used, the exhaustion of ink sheets, a paper jam or trouble in the thermal head may be other causes. In this case, the call receive operation may be done in accordance with various signals indicating non-operability, which are supplied from the recorder 24 to the control circuit 36.

In the above first embodiment, the information derived from the facsimile communication protocol is displayed or recorded. Alternatively, the information derived from the communication protocol may be converted to a voice signal, which may be outputted as audible sound. A second embodiment in which the information derived from the communication protocol is outputted as the audible sound is explained below.

Figure 5:
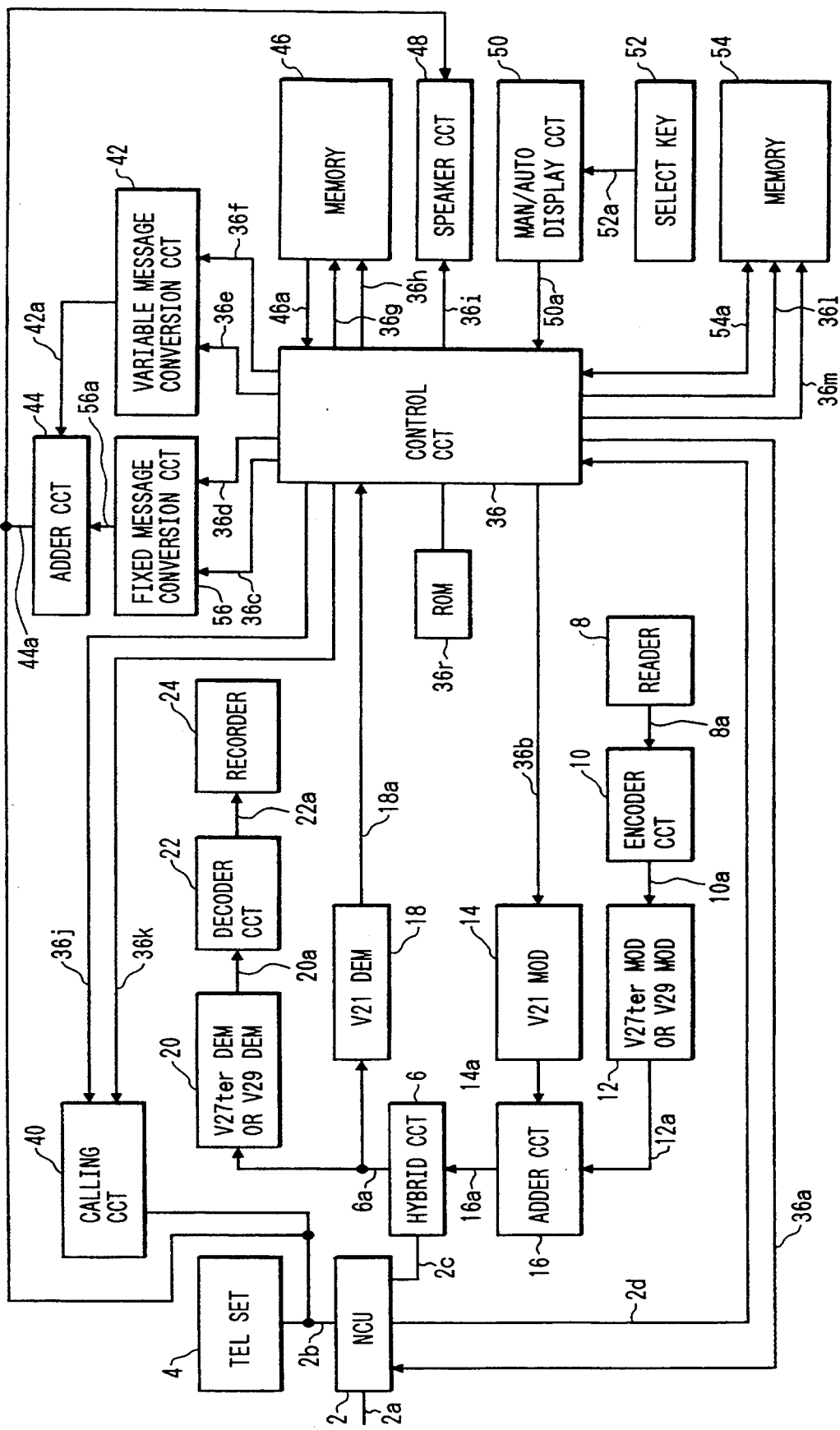
FIG. 5 shows a block diagram of a second embodiment of the facsimile machine.

FIG. 5 shows a block diagram of the second embodiment of the facsimile machine. The like elements to those shown in FIG. 1 are designated by the like numerals and the explanation thereof is omitted here. In the second embodiment shown in FIG. 5, a voice signal comprising a variable message and a fixed message is sent. A fixed message converter 56 comprises a digital speech reproducing circuit and contains a plurality of fixed voice messages prerecorded by a PCM recording method, for example. When a signal level "1" is present on the signal line 36c, the data of the address information designated by the signal line 36d, of the information stored in a memory of a fixed message send circuit is sent to the signal line 56a.

When a signal level "0" is present on the signal line 36c, the fixed message converter 56 stops the voice output.

On the other hand, numeral 42 denotes a variable message converter which outputs a variable voice message and may comprise a known voice synthesis circuit. When a signal level "1" is present on the signal line 36e, the variable message converter 42 converts the information of the calling station user telephone number and user abbreviation represented by character codes supplied from the signal line 36f to voice signals and send them to the signal line 42a. When a signal level "0" is present on the signal line 36e, the variable message converter 28 stops the voice output.

The output of the fixed message converter 56 and the output of the variable message converter 42 are added by an adder 44 and a sum is produced on a signal line 44a. The signal line 44a is connected to a speaker circuit 48 and the signal line 2b (a line of the NCU 2 connected to the telephone set 4).

When the signal level "1" is present on the signal line 36i, the speaker circuit 48 monitors the signal on the signal line 44a, and when the signal level "0" is present on the signal line 36i, it stops the monitoring.

The sum output of the adder 44 for the output of the fixed message converter 56 and the output of the variable message converter 42 is sent through the NCU 2 or outputted as the audible signal by the speaker circuit 48.

In the present embodiment, a memory 46 for storing information sent from a calling station through a protocol signal is provided. The information to be recorded in the memory 46 includes a TSI (transmitting station identification) signal which is normally sent from the image sending station, and a user telephone number and a user abbreviation which are included in an NSS (non-standard equipment setting) signal.

When data is to be stored in the memory 46, the data is sent to the signal line 42a and then a write pulse is generated on the signal line 36g. When the data is to be read from the memory 46, a read pulse is generated on the signal line 36h and then the data on the signal line 46a is read. Information from at least one call can be stored in the memory 46.

Numeral 52 denotes a select key for toggling the call receive mode between the auto-mode and the manual mode. A pulse is generated for each depression, and the pulse is supplied to a manual/auto display 50.

The manual/auto display 50 comprises a liquid crystal display or LED. It displays the setting of the auto-receive mode when a power switch is turned on, and sends a signal level "0" to the signal line 50a. Each time the pulse is generated by the select key 52, the mode display is toggled between the auto mode and the manual mode.

The manual/auto display 50 sends the receive mode setting to the control circuit 36 through the signal line 50a. The manual/auto display 50 sends the signal level "0" to the signal line 50a in the auto-receive mode, and sends the signal level "1" to the signal line 50a in the manual receive mode.

Numeral 40 denotes a calling circuit which comprises a known dialing signal generator. When a call command pulse is generated on a signal line 36k, it reads the telephone number information on a signal line 36j and sends a select signal to the signal line 2b. The calling circuit 40 is used to send to the line the voice message produced by the fixed message converter 56 and the variable message converter 42.

A destination address of the voice message is stored in a memory 54. The memory 54 comprises a RAM. When the telephone number to be used for calling is to be stored, the data is sent to the signal line 54a and then a write pulse is generated on the signal line 36l. When the telephone number is to be read from the memory 54, a read pulse is generated on the signal line 36m and the data is sent to the signal line 54a.

The operation of the above configuration is now explained.

In the facsimile machine of FIG. 5, in the auto-receive mode, the information in the NSS signal and the TSI signal sent from the calling station is stored in the memory 46. When the communication operation is over, the telephone number information included in the TSI signal stored in the memory 46 and the user abbreviation information included in the NSS signal are converted to the voice signals by the fixed message converter 56 and the variable message converter 42.

The voice signals may be outputted as audible signals by the speaker circuit 48 or by sending them to another station.

Figure 6:
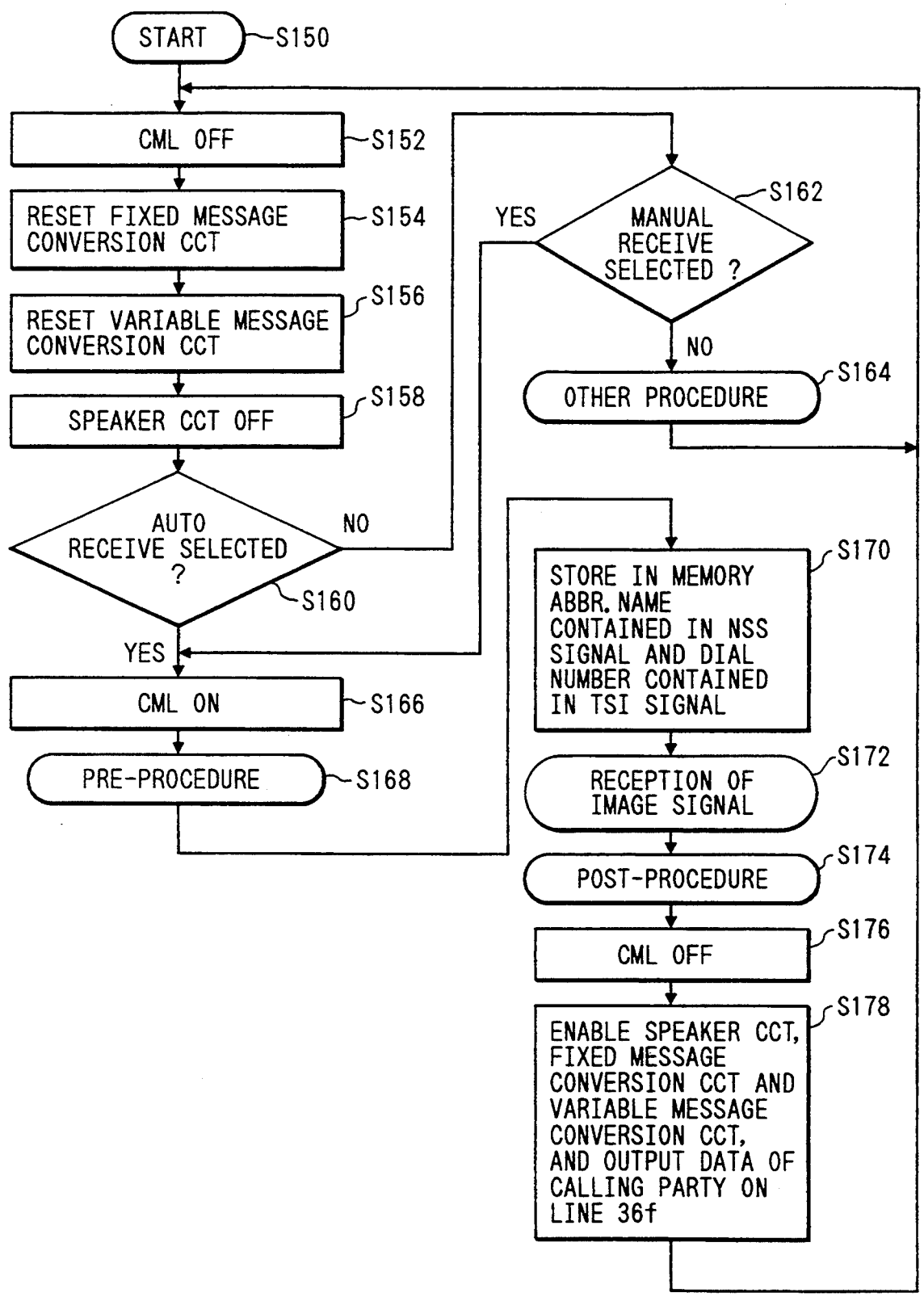
FIGS. 6 and 7 show flow charts of a control sequence in the second embodiment.

FIG. 6 shows a receive control sequence of the control circuit 36 when the voice signal is outputted by the speaker circuit 48.

In a step S152 of FIG. 6, the signal level "0" is sent to the signal line 36a to turn off the CML relay of the NCU 2 to connect the line 2a to the telephone set 4.

In a step S154, the signal level "0" is sent to the signal line 36c to stop the voice output of the fixed message converter 56 (The fixed message converter 56 is reset).

In a step S156, the signal level "0" is sent to the signal line 36e to stop the voice output of the variable message converter 42. (The variable message converter 42 is reset).

In a step S158, the signal level "0" is sent to the signal line 36i to deactivate the speaker circuit 48.

In a step S160, the control circuit 36 examines the signals on the signal lines 2d and 50a to determine whether the auto-receive mode has been selected by the depression of the select key 52. If the auto-receive mode has been selected, the process proceeds to a step S166, and if it has not been selected, the process proceeds to a step S162.

In the step S162 when the auto-receive mode has not been selected, whether the manual receive mode has been selected or not is determined. If the manual receive mode has been selected, the process proceeds to a step S166, and if it has not been selected, the process proceeds to a step S164 to conduct other processes.

Where the auto-reception is effected by known call signal detection, the signal level "1" is sent to the signal line 36a in the step S166 to turn on the CML relay of the NCU 2, that is, connect the line 2a to the hybrid circuit 6.

In a step S168, known facsimile communication pre-protocol is executed. Since the TSI signal and the NSS signal are sent from the image sending station, the user abbreviation information included in the NSS signal and the telephone number information included in the TSI signal are sent to the signal line 46a in a step S170, and a write pulse is generated on the signal line 36g to store the information into the memory 46. After the information derived from the communication protocol has been stored, the image is received in a step S172. Then, in a step S174, the communication post-protocol is executed and the line is disconnected.

In a step S176, the signal level "0" is sent to the signal line 36a to turn off the CML relay of the NCU 2, that is, connect the line 2a to the telephone set 4.

In a step S178, the user abbreviation information included in the NSS signal and the telephone number information included in the TSI signal, stored in the memory 46 are read out and they are converted to voice message by the variable message converter 42, and it is combined with the fixed message from the fixed message converter 56 and the sum signal is outputted by the speaker circuit 48. The signal level "1" is sent to the signal line 36i to activate the speaker circuit 48. Then, the signal level "1" is sequentially sent to the signal lines 36c and 36e to convert the fixed message and the variable information to the voice signals, which are monitored by the speaker.

On the other hand, a read pulse is generated on the signal line 36h of the memory 46 to read the calling station user abbreviation and the telephone number information (represented by character codes) on the signal line 46a. The information is supplied to the signal line 36f and it is converted to a voice signal by the converter 42.

In a step S178, for example, a message "call received from ΔΔΔ Trading Company of 63−7×5−2 image communication apparatus" is outputted by the speaker. "03−7×5−2 image communication apparatus" and "ΔΔΔ Trading Company" are the telephone number information and the calling station user abbreviation, respectively, which are outputted from the variable message converter 42 based on the information stored in the memory 46, and "call received from" and "of" are fixed message stored in the fixed message converter 56. The above voice message is generated by alternately activating the variable message converter 42 and the fixed message converter 56.

With the above configuration, which station has called can be informed by the audible voice so that the user can rapidly conduct a necessary job. By recording as the header information the telephone number information and calling station user abbreviation derived from the protocol signal when the image of the document sheet is recorded by the recorder 24, the derived information can be effectively utilized in a wide range.

Figure 7:
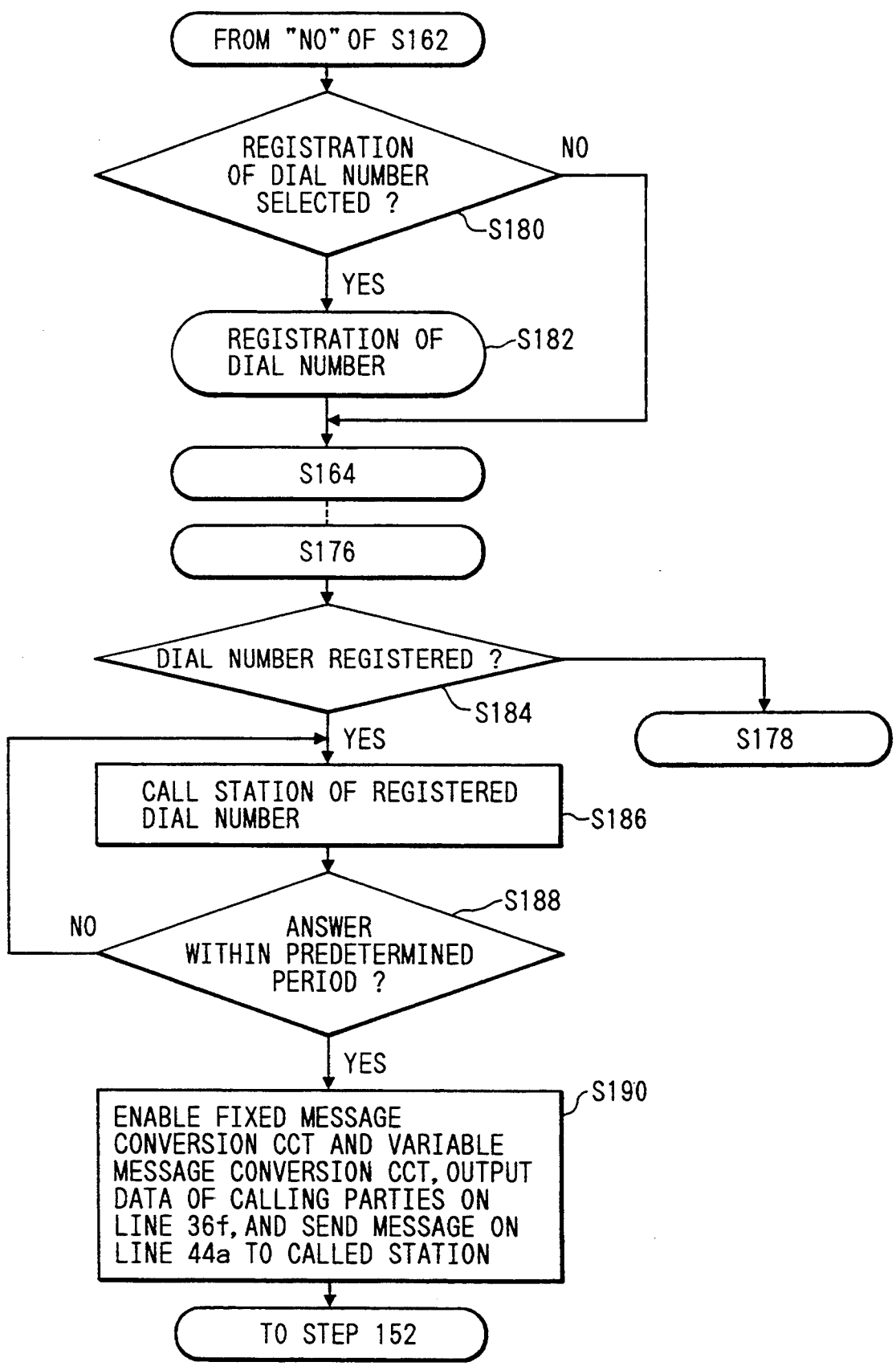

FIG. 7 shows a different control sequence.

In the sequence shown in FIG. 7, the call receive message of the voice signal synthesized by the fixed message converter 56 and the variable message converter 42 can be automatically sent to the station which is preset in the memory 54.

In FIG. 7, only those portions of the sequence of FIG. 6 which are to be newly substituted are shown. The upper portion of FIG. 7 shows steps S180 and S182 which are to be inserted between the steps S162 and S164 of FIG. 6, and the lower portion shows a message sending process which is carried out after the step S176 of FIG. 6 after the execution of the steps S180 and S182.

The process of FIG. 7 is now explained.

In a step S180 of FIG. 7, whether the registration of the telephone number which is used for calling in order to automatically send the voice message at the reception of call has been selected or not is determined. If the registration has been selected, the process proceeds to a step S182 where the telephone number to be used for calling is registered. If the registration has not been selected, the process proceeds to a step S164.

The receive process is conducted in the steps S152 to S176 of FIG. 6, and in the step S184, whether the telephone number to be used for calling has been registered in the memory 54 or not is determined. If it has been registered, the process proceeds to a step S186, and if it has not been registered, the process proceeds to a step S178.

In the step S186, the telephone number to be used for calling is read from the memory 54 and supplied to the signal line 36j, and a call command pulse is generated on a signal line 36k to conduct the calling by the calling circuit 40.

In a step S188, whether the calling station responded in a predetermined time, and more specifically, whether the operator at the calling station responded by hooking off a hand-set or not is determined. If the calling station responds in the predetermined time, the process proceeds to a step S190, and if the calling station does not respond in the predetermined time, the process proceeds to a step S186. The operator's response may be made by detecting polarity inversion of the line by the NCU 2.

In a step S190, like the step S178 in FIG. 6, the fixed message converter 56 and the variable message converter 42 are controlled to synthesize the voice message. The output is sent to the calling station through the NCU 2.

The signal level "1" is sequentially supplied to the signal lines 36c and 36e to convert the fixed message of the fixed message converter 56 and the variable information of the variable message converter 42 to voice signals, and the information summed by the adder 44 is sent to the line.

In the above embodiment, the protocol signals of the NSS signal and the TSI signal are used as media for receiving information to be converted to voice signals, from the calling station. Alternatively, the image signal may be used. In this case, the character information to be converted to the voice signals is extracted from the image signal by optical character recognition processing as may be required.

When the user abbreviation information is not sent from the calling station, the message "call received from 03−7××−2 image communication apparatus" may be outputted or it may sent to the line. When the telephone number information is not sent from the calling station, a voice message "call received from XX trading Company" may be outputted. When the telephone number information and the user abbreviation information are not sent from the calling station, a simple message "call received" may be sent out.

In this manner, where some of the information which may be outputted are not received, only the information which may be outputted is outputted.

In the above embodiments, the voice message is outputted by the speaker circuit 48 or sent to the calling station through the line. Whether it is outputted by the speaker circuit 48 or sent to the calling station may be selected by a switch. Both the outputting by the speaker circuit 48 and the sending to the calling station may be carried out.

In the above embodiment, the reception of the image was explained. When the image is to be sent, a similar control may be done so that the destination station may be specified by the voice message and the end of transmission may be informed.

The above technique may be applicable to various image communication apparatus other than the facsimile machine.

In addition to the first and second embodiments described above, a third embodiment of the present invention is explained.

Figures 8, 9A, 9B:
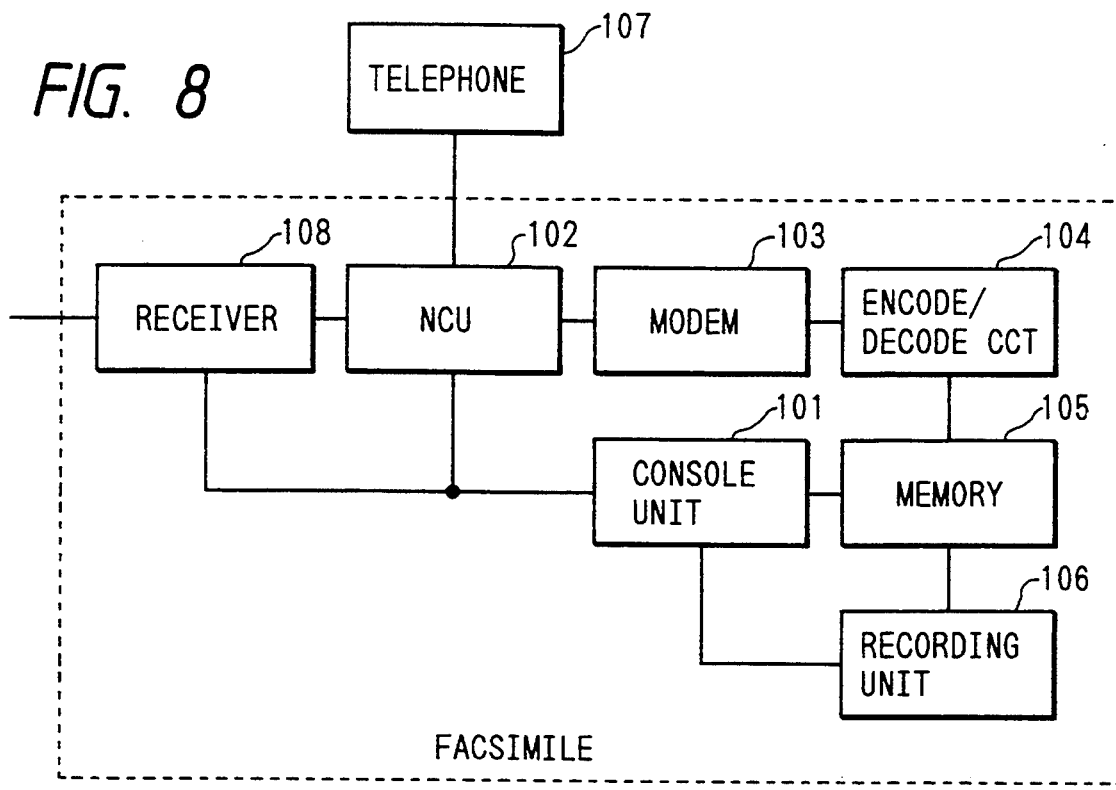
FIG. 8 shows a block diagram of a third embodiment of the facsimile machine.
FIGS. 9A and 9B show examples of standard texts in the third embodiment, and FIG. 10 show a flow chart of an operation of the third embodiment.

FIG. 8 shows a block diagram of the third embodiment of the facsimile machine.

The facsimile machine comprises a console unit 101 by which an operator requests to the apparatus the control of operations, an NCU 102 which controls TEL/FAX auto-switching to a line, a modem which modulates a signal to be sent and demodulates a received signal, an encoder/decoder 104 which encodes the signal to be sent and decodes the received signal, a memory 105 which stores various data, a recorder 106 which prints out an image on a record sheet, a telephone set 107 for telephone communication, and a receiver 108.

The console unit 101 includes a microcomputer for controlling the overall apparatus, a read-only memory (ROM) which stores a control program, and a random access memory (RAM) which temporarily stores various data.

In the facsimile machine, the operator at the called station previously stores telephone numbers of persons concerned or trading parties and abbreviations thereof in the memory 105 through the console unit 101.

When a call is received, the NCU 102 automatically detects whether the calling station terminal is a telephone set or a facsimile machine. If it is the facsimile machine, the NCU 102 requests further operation to the facsimile machine and a normal receiving operation of the facsimile is carried out. In this case, the telephone number of the calling station can be identified by the TSI signal which is the pre-protocol signal of the facsimile.

When the NCU 102 determines that the calling station terminal is the telephone set, the facsimile machine makes pseudo-ring sound to call the operator. If the operator does not respond, the line is released after ringing for a predetermined period.

During the call to the operator or the capture of the line, a signal which represents the telephone number of the calling station is sent from an exchange and the receiver 108 receives it. The received telephone number is compared with the telephone numbers stored in the memory 105, and if a corresponding party is found, a standard text message shown in FIG. 9 is outputted from the recorder 106 so that a message indicating who and when called is left during the absence of the called station user. All data may be left in the memory 205 and the user may collectively output it.

If a time frame during which the user is absent is preset, the data of the call done during that time frame may be automatically outputted by the recorder 106 after the elapse of the time frame. Those settings may be done through the console unit 101.

FIG. 10 shows a flow chart of the process of the present embodiment.

When the facsimile machine is in the auto-receive mode and receives a call sound CI (16 Hz), the receive mode is automatically initiated (S201). Whether the calling station terminal is the facsimile machine or the telephone set is determined (S202). If it is the facsimile machine, a normal receive operation is initiated (S203). If it is the telephone set in the step S202, the facsimile machine makes pseudo-ring sound to call the operator (S204). Whether the telephone set has been hooked off during this period or not is checked (S205). If it has been hooked off, the telephone mode is initiated (S213). If it is on-hook state, the operator call period is checked (S206), and if the period is not timed out, whether the signal indicating the telephone number of the calling station has been detected or not is checked (S207). If the telephone number has been detected, it is stored in the memory 105 (S208), and the process returns to the step S204. If the telephone number is not detected, the process also returns to the step S204 and repeats the series of steps.

If the period is timed out in the step S206, whether the signal indicating the telephone number of the calling station has been stored in the memory 105 or not is checked (S209). If it has not been stored, no action is taken and the process terminates. If it has been stored, it is compared with the content of the memory 105 (S210). If no corresponding one is found (S211), the standard text shown in FIG. 9A is printed out (S212). If no corresponding one is found, a standard text which includes only the telephone number as shown in FIG. 9B is printed out (S214).

In the present embodiment, it is assumed that the signal representing the telephone number of the calling station is sent from the exchange, and the telephone numbers of the calling stations are pre-registered in the memory 105. Where the calling station is equipped with an apparatus which can send out a DTMF signal, the calling station may be selected by an ID number other than the telephone number by using the DTMF signal to output the standard text.

The operator at the called station registers the ID number (for example, comprising 4-digit number) instead of the telephone number, and the corresponding abbreviations. Like in the above embodiment, when a call is received, it is assumed that the calling station terminal is the telephone set and the pseudo-ring sound is generated to call the user at the called station. During the capture of the line, the calling station sends out the DTMF signal corresponding to the ID signal of its own through the telephone set. The called station detects the DTMF signal sent from the calling station by the receiver 108 and compares it with the ID numbers stored in the memory 205. If a corresponding one is found, the standard text shown in FIG. 9A is outputted from the recorder 106. If no corresponding one is found, the standard text shown in FIG. 9B is outputted by the recorder 106.

In accordance with the present embodiment, even if the called party does not respond to the telephone call, the information which indicates the call from the calling station is printed out so that the fact of the receipt of call is informed to the called party. Thus, the use of the line by the calling party is not wasted and effective response by the called party can be requested.

The present invention is not limited to the embodiments described above but various modifications thereof may be made.

We claim:

1. An image communication apparatus, comprising:
   protocol communication means responsive to a calling signal from a line for performing a protocol communication for image communication over the line;
   image communication means for communicating image data over the line in accordance with the protocol communication;
   means for discriminating, after receiving the calling signal, whether or not it is possible to communicate image data, and when it is impossible to communicate image data, for causing said protocol communication means to perform a protocol communication that includes receiving a protocol signal from a calling station including data for identifying the calling station without communication of image data by said image communication means; and
   means for outputting data indicating which calling station issued the calling signal to said apparatus when communication of image data is impossible, on the basis of the data for identifying the calling station included in the protocol signal from the calling station and received by said protocol communication means.

2. An image communication apparatus according to claim 1 further comprising:
   command means for commanding the outputting of the data by said means for outputting; and
   said means for outputting, outputting the data in response to a command of said command means.

3. An image communication apparatus according to claim 1 where said means for outputting outputs the data as a record.

4. An image communication apparatus according to claim 1 further comprising:
   time setting means for setting a predetermined absence time,
   wherein said means for outputting prints out the information from a plurality of calling stations when plural calls are received in the time set by said time setting means.

5. An apparatus according to claim 1, wherein said discriminating means causes said protocol communication means to perform the protocol communication that includes receipt of the protocol signal from the calling station even when it is impossible to communicate image data due to an absence of recording paper at said apparatus.

6. An image communication apparatus, comprising:
   protocol communication means for transmitting and receiving protocol signals of various types over a line;
   image data communication means for communicating image data over the line in accordance with a protocol communication performed by said protocol communication means;
   detection means for detecting a calling signal from the line;
   control means responsive to the calling signal for controlling the protocol communication and image data communication, wherein said control means discriminates whether or not it is possible to communicate image data, and causes said protocol communication means to perform protocol communication that includes receiving a protocol signal from a calling station including data for identifying the calling station when it is impossible to communicate image data;
   memory means for storing the data that identifies the calling station and is included in the protocol signal from the calling station received by performing the protocol communication; and
   means for outputting data indicating which calling station issued the calling signal to said apparatus when communication of image data is impossible, on the basis of the identifying data stored in said memory means.

7. An image communication apparatus according to claim 6 wherein said means for outputting outputs the data as a record.

8. An apparatus according to claim 6, wherein said control means causes said protocol communication means to perform the protocol communication that includes receipt of the protocol signal from the calling station even when it is impossible to communicate image data due to an absence of recording paper at said apparatus.

9. An image communication apparatus which performs a protocol communication by sending and receiving protocol signals of various types and communicates image data on the basis of the protocol communication, said apparatus comprising:
   means for detecting a calling signal from a calling station over a line;
   control means, responsive to the calling signal, for executing a communication control procedure that discriminates whether or not it is possible to communicate image data, and either causing communication of image data over the line or causing performance of the protocol communication over the line that includes receiving a protocol signal from a calling station including data for identifying the calling station without communicating image data, in accordance with a result of the discrimination;

memory means for storing the data that identifies the calling station and is included in the protocol signal from the calling station received by performing the protocol communication; and means for outputting data indicating which calling station issued the calling signal to said apparatus when communication of image data is impossible, on the basis of the identifying data stored in said memory means.

10. An apparatus according to claim 9, wherein, when it is impossible to communicate image data, said control means notifies the calling station that communication of image data is impossible by including a notice in the communication protocol.

11. An apparatus according to claim 10, wherein said control means discriminates a type of terminal of the calling station, and notifies the impossibility of communication of image delta by executing the communication protocol in accordance with a result of the discrimination.

12. An apparatus according to claim 9, wherein said control means causes the performance of a protocol communication that includes receipt of the protocol signal from the calling station even when it is impossible to communicate image data due to an absence of recording paper at said apparatus.

13. An image communication apparatus which performs a communication protocol by sending and receiving protocol signals of various types and communicates image data on the basis of the communication protocol, said apparatus comprising:

means for communicating image data over a line;

extracting means for extracting identification data for identifying a calling station from a predetermined protocol signal received from the calling station over the line by performing the communication protocol;

converting means for converting the identification data into a voice signal;

registration means for registering a predetermined telephone number;

output means for outputting as an audible signal the voice signal produced by said converting means; and control means for changing a destination of an output from said output means in accordance with whether or not the telephone number is registered in said registration means.

14. An image communication apparatus according to claim 13, wherein said means for communicating performs an image communication and said output means outputs the voice signal at the end of the image communication.

15. An apparatus according to claim 13, further comprising means for calling a predetermined destination registered in advance to send the voice signal, received from said converting means, to the destination.

16. An apparatus according to claim 13, wherein said control means dials a telephone number registered in the registration means to send an output signal from said output means to a predetermined partner station when the telephone number is registered in said registration means, and supplies the output signal from said output means to a speaker when the telephone number is not registered in said registration means.

17. An image communication method comprising the steps of:

performing a protocol communication for image communication over a line responsive to a calling signal received from the line;

communicating image data over the line in accordance with the protocol communication;

discriminating, after receiving the calling signal, whether or not it is possible to communicate image data and, when it is impossible to communicate image data, performing a protocol communication of said protocol communicating step that includes receiving a protocol signal from a calling station including data for identifying the calling station without communication of image data of said image communicating step; and outputting data indicating which calling station issued the calling signal when communication of image data is impossible, on the basis of the data for identifying the calling station included in the protocol signal from the calling station and received in said protocol communicating step.

18. An image communication method according to claim 17, further comprising the step of inputting a command for outputting the data in said outputting step, wherein the data is outputted in said outputting step in response to the command.

19. An image communication method according to claim 17, wherein the data is outputted as a record in said outputting step.

20. An image communication method according to claim 17, further comprising the step of setting a predetermined absence time, wherein in said outputting step the data for all calls received in the time set in said time setting step is printed out.

21. An image communication method according to claim 17, wherein in said protocol communicating step, the protocol communication is performed that includes receipt of the protocol signal from the calling station even when it is impossible to communicate image data due to an absence of recording paper at said apparatus.

22. An image communication method, comprising the steps of:

transmitting and receiving protocol signals of various types over a line;

communicating image data over the line in accordance with a protocol communication performed in said protocol communication step;

detecting a calling signal from the line;

controlling the protocol communication and image data communication responsive to the calling signal, said controlling step including discriminating whether or not it is possible to communicate image data and performing the protocol communication of said protocol communication step that includes receiving a protocol signal from a calling station including data for identifying the calling station when it is impossible to communicate image data;

storing the data that identifies the calling station and is included in the protocol signal from the calling station received by performing the protocol communication; and outputting data indicating which calling station issued the calling signal when communication of image data is impossible on the basis of the identifying data stored in said storing step.

23. An image communication method according to claim 22, wherein in said outputting step the data is outputted as a record.

24. A method according to claim 22, wherein in said controlling step the protocol communication of said protocol communication step is performed that includes receipt of the protocol signal from the calling station even when it is impossible to communicate image data due to an absence of recording paper at said apparatus.

25. An image communication method which performs a protocol communication by sending and receiving protocol signals of various types and communicates image data on the basis of the protocol communication, said method comprising the steps of:
 detecting a calling signal from a calling station over a line;
 responsive to the calling signal, executing a communication control procedure that discriminates whether or not it is possible to communicate image data, and either causing communication of image data over the line or causing performance of the communication protocol over the line that includes receiving a protocol signal from a calling station including data for identifying the calling station without communicating image data, in accordance with a result of the discrimination;
 storing the data that identifies the calling station and is included in the protocol signal from the calling station received by performing the protocol communication; and
 outputting data indicating which calling station issued the calling signal when communication of image data is impossible on the basis of the identifying data stored in said storing step.

26. A method according to claim 25, wherein when it is impossible to communicate image data, the calling station is notified that communication of image data is impossible by including a notice in the communication protocol executed in said control step.

27. A method according to claim 25, wherein in said discriminating step, a type of terminal of the calling station is discriminated and when it is impossible to communicate image data, the calling station is notified that communication of image data is impossible by including a notice in the communication protocol executed in said control step in accordance with a result of the discrimination.

28. A method according to claim 25, wherein the protocol communication is performed that includes receipt of the protocol signal from the calling station even when it is impossible to communicate image data due to an absence of recording paper at said receiving apparatus.

29. An image communication method which performs a communication protocol by sending and receiving protocol signals of various types and communicates image data on the basis of the communication protocol, said method comprising the steps of:
 communicating image data over a line;
 extracting identification data for identifying a calling station from a predetermined protocol signal received from the calling station over the line by performing the communication protocol;
 converting the identification data into a voice signal;
 registering a predetermined telephone number;
 outputting as an audible signal the voice signal produced in said converting step; and
 changing a destination of an output from said outputting step in accordance with whether or not the telephone number is registered in said registering step.

30. An image communication method according to claim 29, wherein in said communicating step an image communication is performed, and in said outputting step the voice signal is outputted at the end of the image communication.

31. A method according to claim 29, further comprising the step of calling a predetermined destination registered in advance to send the voice signal, received from said converting step, to the destination.

32. A method according to claim 29, wherein in said changing step a telephone number registered in the registering step is dialed to send an output signal from said output step to a predetermined partner station when the telephone number is registered in said registering step, and supplies the output signal from said outputting step to a speaker when the telephone number is not registered in said registering step.

* * * * *

UNITED STATES PATENT AND TRADEMARK OFFICE
CERTIFICATE OF CORRECTION

PATENT NO. : 5,442,686
DATED : August 15, 1995
INVENTOR(S) : SATOSHI WADA, ET AL.

It is certified that error appears in the above-identified patent and that said Letters Patent is hereby corrected as shown below:

COLUMN 3

Line 41, "(change" should read --(charge--.

COLUMN 12

Line 2, "63-7x5-2" should read --03-7x5-2--.

COLUMN 14

Line 26, "memory 205" should read --memory 105--.
Line 61, "no" should read --a--.

COLUMN 15

Line 19, "memory 205." should read --memory 105.--.

UNITED STATES PATENT AND TRADEMARK OFFICE
CERTIFICATE OF CORRECTION

PATENT NO. : 5,442,686
DATED : August 15, 1995
INVENTOR(S) : SATOSHI WADA, ET AL.

It is certified that error appears in the above-identified patent and that said Letters Patent is hereby corrected as shown below:

COLUMN 17

Line 21, "delta" should read --data--.

Signed and Sealed this

Thirteenth Day of February, 1996

Attest:

BRUCE LEHMAN

Attesting Officer        Commissioner of Patents and Trademarks